(12) United States Patent
Varoglu (10) Patent No.: US 9,021,101 B2
(45) Date of Patent: Apr. 28, 2015

(54) USING A PROPERTY OF A RECEIVED SIGNAL TO DETERMINE A DEVICE FOR FORMING A NETWORK CONNECTION

(75) Inventor: Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 12/726,226

(22) Filed: Mar. 17, 2010

(65) Prior Publication Data

US 2011/0231556 A1    Sep. 22, 2011

(51) Int. Cl.
| | |
|---|---|
| G06F 15/16 | (2006.01) |
| H04W 76/02 | (2009.01) |
| H04W 48/20 | (2009.01) |
| H04W 84/18 | (2009.01) |

(52) U.S. Cl.
CPC .............. *H04W 76/02* (2013.01); *H04W 48/20* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,873,825 B2 | 3/2005 | Pattabiraman | |
| 6,940,843 B2 | 9/2005 | Goodall | |
| 7,146,417 B1* | 12/2006 | Coile et al. ............... | 709/224 |
| 7,165,102 B2* | 1/2007 | Shah et al. ............... | 709/223 |
| 8,275,377 B2* | 9/2012 | Nanda et al. ............... | 455/436 |
| 8,781,397 B2 | 7/2014 | Sole | |
| 2002/0034943 A1* | 3/2002 | Pallonen ............... | 455/424 |
| 2003/0152034 A1* | 8/2003 | Zhang et al. ............... | 370/252 |
| 2003/0220765 A1 | 11/2003 | Overy et al. | |
| 2004/0199668 A1* | 10/2004 | Lin et al. ............... | 709/241 |
| 2005/0073522 A1* | 4/2005 | Aholainen et al. ............... | 345/440 |
| 2006/0056636 A1 | 3/2006 | Schrum, Jr. | |
| 2006/0187865 A1 | 8/2006 | Sakai | |
| 2007/0027980 A1* | 2/2007 | Herrod et al. ............... | 709/224 |
| 2007/0123215 A1* | 5/2007 | Wang et al. ............... | 455/411 |
| 2007/0242729 A1 | 10/2007 | Quinn et al. | |
| 2007/0249288 A1 | 10/2007 | Moallemi et al. | |
| 2008/0031144 A1* | 2/2008 | Kawamoto et al. ............... | 370/242 |
| 2008/0146151 A1 | 6/2008 | Lyu | |
| 2008/0184345 A1 | 7/2008 | Kaechi | |
| 2013/0223423 A1* | 8/2013 | Lee et al. ............... | 370/338 |
| 2014/0295762 A1* | 10/2014 | Jung et al. ............... | 455/41.2 |

FOREIGN PATENT DOCUMENTS

| | | |
|---|---|---|
| WO | 03056797 A1 | 7/2003 |
| WO | 2013131029 A3 | 6/2013 |

\* cited by examiner

*Primary Examiner* — Brian P Whipple
(74) *Attorney, Agent, or Firm* — Park, Vaughan, Fleming & Dowler LLP; Anthony P. Jones (57) ABSTRACT

The described embodiments include an electronic device that uses a property of received signals to determine another device for forming a network connection. During operation, the electronic device receives a signal from each of two or more other devices. The electronic device then compares a property of each received signal to the other received signals to determine a signal that has a property most like a target property. Next, the electronic device selects the other device that was the source of the determined signal and forms the network connection with the selected other device.

19 Claims, 4 Drawing Sheets

USING A PROPERTY OF A RECEIVED SIGNAL TO DETERMINE A DEVICE FOR FORMING A NETWORK CONNECTION

BACKGROUND

1. Field

The described embodiments relate to techniques for forming network connections in an electronic device. More specifically, the described embodiments relate to a technique for using a property of a received signal to determine a device for forming a network connection.

2. Related Art

Electronic devices are ubiquitous in modern life. For example, many people have laptop computers, smart phones, tablet computers, and/or other types of electronic devices they use for checking email, keeping track of friends in social networks, handling business transactions, making phone calls, and performing numerous other tasks. Many of these electronic devices include mechanisms for forming wired or wireless network connections with other devices to enable the electronic device to exchange data with the other devices. For example, these devices can include mechanisms for forming Bluetooth™ network connections (Bluetooth is a trademark of the Bluetooth SIG, Kirkland, Wash.), WiFi peer-to-peer network connections, wired/wireless personal-area-network (PAN) connections, and/or other wired or wireless network connections.

Generally, the formation of network connections between devices involves a number of well-defined operations. For example, to form a Bluetooth™ network connection, a device (device A) first makes an inquiry on an inquiry scan channel to determine if other devices are available for forming a Bluetooth™ network connection (i.e., an ad-hoc Bluetooth™ piconet). This operation involves device A using a radio interface to hop to each frequency in a predetermined set of frequencies. At each frequency, device A sends an inquiry and briefly awaits a response from any available devices before hopping to a next frequency. If a response is received from another device (device B), the response includes an identifier for the device (e.g., a device name and/or MAC address for device B). Device A can then use the received device identifier to perform a page scan in a separate page scan channel to obtain clock and channel hop sequence information that is used to facilitate subsequent communication with device B. Device A then uses the information obtained during the page scan to form a physical (wireless) link with device B.

In some cases, an electronic device that is attempting to form a network connection with another device can encounter numerous devices that are each available for forming network connections (e.g., multiple devices that respond to inquiry scans in a Bluetooth™ system). A user of the electronic device can then be forced to determine a device or devices from among the multiple available devices for forming the network connection. The decision can be confusing and frustrating in a location where the device(s) with which the user intends to form the network connection are not clear (e.g., from device identifications, etc.) or for devices, such as wireless headphones, where the user has little control over the formation of network connections.

SUMMARY

The described embodiments include an electronic device that uses a property of received signals to determine another device for forming a network connection. During operation, the electronic device receives a signal from each of two or more other devices. The electronic device then compares a property of each received signal to the other received signals to determine a signal that has a property most like a target property. Next, the electronic device selects the other device that was the source of the determined signal and forms the network connection with the selected other device.

In some embodiments, when comparing the property for the received signals, the electronic device measures, acquires, derives, or computes a value representing the property of each received signal. The electronic device then compares the value representing the property for each received signal to the value representing the property for the other received signals to determine which of the signals has a property value closer to a target property value.

In some embodiments, the electronic device is configured so that: (1) the property of the received signals that is compared is the signal strength; (2) the target property value represents a predetermined signal strength; and (3) the computed value of the strength of the received signal is a received signal strength indicator (RSSI).

In some embodiments, when selecting the other device, the electronic device compares a second property of each received signal to the other signals to determine a signal that has a second property most like a second target property. In these embodiments, when selecting the other device that was the source of the determined signal, the electronic device adjusts the selection of the other device to account for the source of the signal with the property value most like the second predetermined target property value.

In some embodiments, when adjusting the selection of the other device to account for the source of the signal with the property value most like the second predetermined target property value, the electronic device selects the other device with the signal with the property value most like the second predetermined target property value, without regard as to whether the signal has a property value most like the target property.

In some embodiments, when selecting the other device, the electronic device determines a contextual value for the electronic device. In these embodiments, when selecting the other device that was the source of the determined signal, the electronic device adjusts the selection of the other device to account for the determined contextual value.

In some embodiments, when determining the contextual value, the electronic device determines at least one value that represents an internal or external state or environment of the electronic device.

In some embodiments, when comparing the property of the received signals, the electronic device compares: (1) a signal strength, noise, or frequency component of the signals; (2) a content, arrangement, bandwidth, or format of the signals; (3) information encoded in the signals; or (4) an actual or derived electromagnetic property of the signals.

In some embodiments, when receiving a signal from each of the other devices, the electronic device receives a signal from each other device that indicates that the other device is available for forming the network connection.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system. For example, the computer-readable storage medium can include volatile memory or non-volatile memory, including flash memory, random access memory (RAM, SRAM, DRAM, RDRAM, DDR/DDR2/DDR3 SDRAM, etc.), read-only memory (ROM), magnetic or optical storage devices (e.g., disk drives, magnetic tape, CDs, DVDs), or other mediums capable of storing data structures or code. In the described embodiments, the computer-readable storage medium can be included in memory subsystem 104 (see FIG. 1) or in another of the subsystems in electronic device 100. Note that the computer-readable storage mediums herein described do not include transmission mediums.

Some or all of the methods and processes described in the following description can be embodied as program code that is stored in a computer-readable storage medium. When an electronic device (e.g., electronic device 100) reads and executes the program code stored on the computer-readable storage medium, the electronic device performs the methods and processes in the program code stored in the computer-readable storage medium.

Some or all of the methods and processes described in the following description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits (e.g., general-purpose circuits in processing subsystem 102) that can be configured by executing instructions to perform the methods and processes.

Overview

The described embodiments include an electronic device 100 (see FIG. 1) that uses a property of signals received from two or more other devices to identify one of the other devices with which a network connection is to be formed. More specifically, during operation, while searching for another device for forming a network connection, electronic device 100 receives two or more signals from other devices that are available for forming network connections. Electronic device 100 then compares a property for each received signal to the same property for the other received signals to determine which of the received signals is closest to a target form or value of the property. Next, electronic device 100 forms a network connection with the other device for which the property of the received signal was the closest to the target form or value of the property.

Generally, in making the comparison, the described embodiments can use any property of the signals that can be acquired and/or derived from a received signal and compared with a similar property from another received signal. For example, in some embodiments, the property of the received signals used by electronic device 100 is the strength of the signals. As another example, some embodiments use a content, arrangement, or format of the received signal. As yet other examples of properties, electronic device 100 can use, but is not limited to: information acquired from the signal or data encoded in the signal; the frequency or frequency components of the received signal; the apparent or computed noise in the received signal; the synchronization of transitions in the signal; the uptime/downtime of the signal; or the electromagnetic properties of the signal.

In some embodiments, electronic device 100 can use one or more other properties of electronic device 100, the other devices, and/or the network to determine one of the other devices for forming a network connection. For example, electronic device 100 can use, but is not limited to, a physical location of electronic device 100 or the other device(s); a direction the user is facing; the acceleration or velocity of the device; an identifier of the network and/or the other device; a date and/or time of day; the language in which the other device is communicating; one or more prompts or hints from the user of electronic device 100; and/or other properties of electronic device 100, the network and/or the other device.

In some embodiments, electronic device 100 can perform one or more additional operations before determining the other device with which the network connection is to be formed. For example, assuming that electronic device 100 is attempting to form a Bluetooth™ network connection, electronic device 100 can perform an inquiry scan to find other devices. From the responses received, electronic device 100 can select the top several devices in terms of a property of the received inquiry responses, such as signal strength or estimated noise in the received signal (e.g., if 5 responses are received, electronic device 100 can select the top 2-3 in terms of signal strength or noise). Electronic device 100 can then send a page request, and possibly a service discovery request, to the selected other devices to determine more information about the device (e.g., services or profiles hosted) before determining a device for forming a network connection. In this way, the determination of the property of the signal in response to the inquiry request serves as one operation in a sequence of operations in finding another device for forming a network connection.

In some embodiments, electronic device 100 can continue to receive signals from other devices after a network connection is formed with a given device. In these embodiments, after the network connection is formed with a first device, electronic device 100 can switch the existing network connection from the first device to a second device upon determining that the signals being received from the second device are closer to a target value for the property than the signals being received from the first device. In addition, in embodiments that support connections to multiple devices, electronic device 100 can dynamically add and/or remove network connections to two or more devices.

Electronic Device

Figure 1:
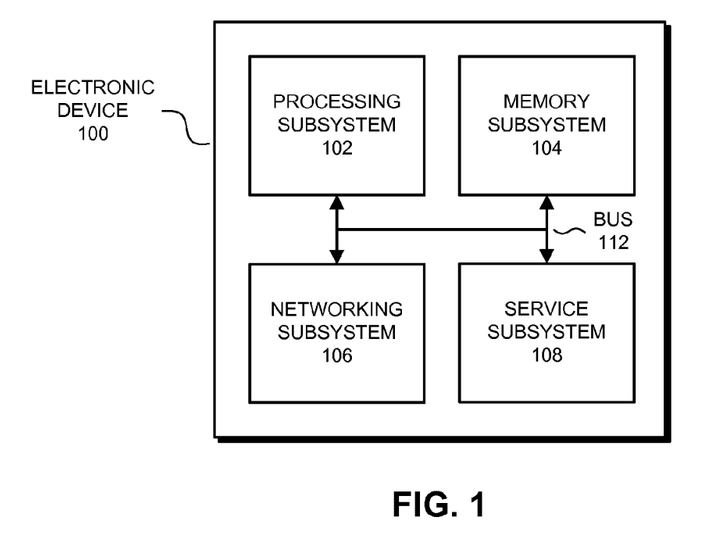
FIG. 1 presents a block diagram illustrating an electronic device in accordance with the described embodiments.

FIG. 1 presents a block diagram illustrating an electronic device 100 in accordance with the described embodiments. Electronic device 100 includes processing subsystem 102, memory subsystem 104, networking subsystem 106, and service subsystem 108.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can also include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently accessed data.

Networking subsystem 106 can include one or more devices configured to couple to and communicate on a wired and/or wireless network (i.e., to perform network operations). For example, networking subsystem 106 can include, but is not limited to, a Bluetooth™ networking system, a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad-hoc network connection (e.g., an ad-hoc wireless PAN) with other devices.

Note that we describe "forming a network connection" in this description; generally, this terminology indicates using networking subsystem 106 to form a physical network connection (wired or wireless) between two or more devices. In the described embodiments, forming a network connection can involve performing one or more operations to enable communication on the physical network connection.

Service subsystem 108 can include any subsystem configured to perform one or more services within electronic device 100. Generally, service subsystem 108 includes one or more functional blocks, components, circuits, elements, transducers, monitors, and/or sensors that can be used to perform the services. (Note that, although in the following paragraphs we describe several services that can be provided by service subsystem 108, in alternative embodiments, service subsystem 108 can provide more and/or different services.)

For example, service subsystem 108 can include one or more location-sensing systems. The location-sensing systems can include, but are not limited to, global positioning systems (GPS), cellular-phone-system-based location systems (e.g., cell-identification (cell-ID), cell-ID++, enhanced observable time difference (E-OTD), and/or 3G positioning), and/or WiFi positioning systems for determining a geographical location of electronic device 100. In embodiments where service subsystem 108 includes two or more of these location-sensing systems, the location-sensing systems can be used separately, or can be used in combination to sense a location of electronic device 100. In addition, service subsystem 108 can include one or more compasses or direction-indicating mechanisms that can be used to determine the direction that electronic device 100 is oriented (e.g., as electronic device 100 is held by a user).

As another example, service subsystem 108 can include one or more sensing systems, each coupled to one or more sensors for sensing external and/or internal conditions for tracking a current, past, or projected future state for electronic device 100 (i.e., for processing subsystem 102, memory subsystem 104, networking subsystem 106, and/or service subsystem 108 within electronic device 100). For example, service subsystem 108 can include sensors such as accelerometers, compasses, tilt/rotation detectors, thermometers, ambient light sensors, atmospheric pressure sensors (barometers), cameras, microphones, and/or timers/clocks.

As yet another example, service subsystem 108 can include one or more monitoring systems coupled to internal hardware and/or software monitors for tracking a current, past, or projected future state for electronic device 100. For example, service subsystem 108 can include, but is not limited to, monitors for tracking processing subsystem 102's workload, temperature, application profile (i.e., what applications are executing on processing subsystem 102), and/or I/O activity. As another example, service subsystem 108 can include, but is not limited to, monitors for tracking the networks available to networking subsystem 106, or networking subsystem 106's connectivity, traffic patterns, and/or bandwidth usage.

As still another example, service subsystem 108 can include one or more logging services for logging a state of electronic device 100. In some embodiments, each logging service can be configured to record events and data from one or more of the services provided by service subsystem 108. For example, assuming that service subsystem 108 includes a location-sensing system, the logging service can be configured to capture location information from the location-sensing system and log the information. In some embodiments, the service subsystem 108 can be configured to store the logged state in memory subsystem 104 (including storing the logged state in non-volatile storage, so that the state is maintained if a power supply for electronic device 100 is turned off or lost).

In the embodiments that track a projected future state for electronic device 100, service subsystem 108 can automatically sample a state of electronic device 100 at a predetermined interval. Service subsystem 108 can then project a future state for electronic device 100 based on a predetermined number of prior samples. For example, if a temperature of electronic device 100 has been 75° F. over a prior 12 samples at 10-minute intervals, service subsystem 108 can project that the temperature of electronic device 100 will remain 75° for a next sample. Alternatively, if the device (being carried by the user) has been moving southwest at 4 miles per hour for the previous 3 minutes, the device can project a continued travel at this velocity and heading. Alternatively, the device can project an arrival at a known destination from a prior arrival at the destination (e.g., from a current location to work at 8 AM on a non-holiday Monday).

Within electronic device 100, the subsystems (i.e., processing subsystem 102, memory subsystem 104, networking subsystem 106, and service subsystem 108) are coupled together using bus 112. Bus 112 is an electrical connection that the subsystems can use to communicate commands and data among one another. Although only one bus 112 is shown for clarity, different embodiments can include a different number or configuration of electrical connections among the subsystems.

Although shown as separate subsystems in FIG. 1, in some embodiments, some or all of a given subsystem can be integrated into one or more of the other subsystems in electronic device 100. For example, as described above, one or more caches in memory subsystem 104 can be included in processing subsystem 102 and/or another of the subsystems. Although alternative embodiments can be configured in this way, for clarity we describe the subsystems separately.

Electronic device 100 can be any of a number of different types of electronic devices or combinations of electronic devices. Generally, these electronic devices include any device that can compare a signal property for two or more signals received from other devices to determine a device for forming a network connection. For example, electronic device 100 can be a desktop computer, a laptop computer, a server, a media player, an appliance, a tablet computer, a subnotebook/netbook, a network appliance, a set-top box, a personal digital assistant (PDA), a smart phone, a toy, a remote control, a set of headphones, a microphone, an audio/video receiver, a playback mechanism, a controller, or another device.

Although we use specific components to describe electronic device 100, in alternative embodiments, different components and/or subsystems may be present in electronic device 100. For example, electronic device 100 may include one or more additional processing subsystems 102, memory subsystems 104, networking subsystems 106, and/or service subsystems 108. Alternatively, one or more of the subsystems may not be present in electronic device 100. In addition, in some embodiments, electronic device 100 may include one or more additional subsystems that are not shown in FIG. 1. For example, electronic device 100 can include, but is not limited to, a display subsystem, a media processing subsystem, an input/output (I/O) subsystem, a data collection subsystem, an audio subsystem, and/or an alarm subsystem.

Operating System

Figure 2:
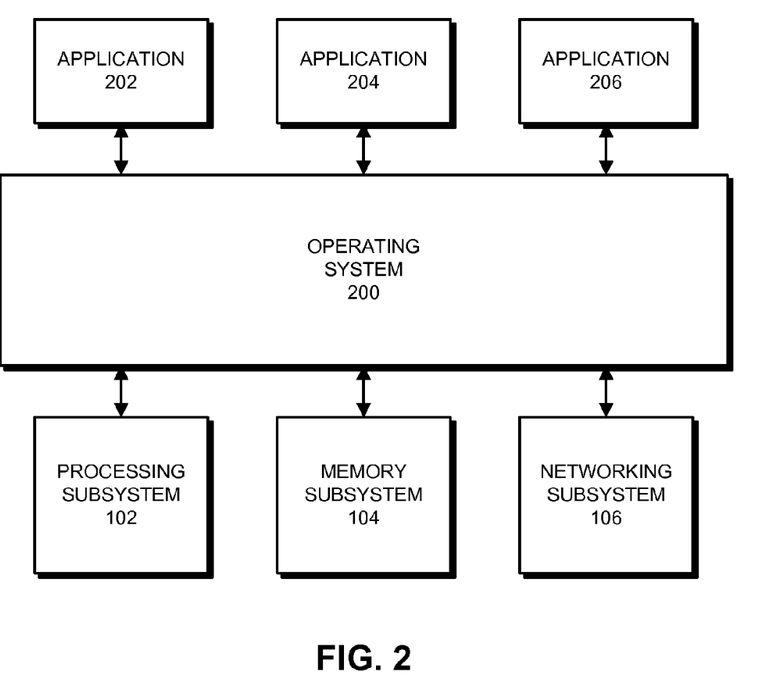
FIG. 2 presents an operating system executed by a processing subsystem in accordance with the described embodiments.

FIG. 2 presents an operating system 200 executed by processing subsystem 102 in accordance with the described embodiments. Generally, operating system 200 serves as an intermediary between system hardware in electronic device 100 (e.g., subsystems 102-106) and applications executed by processing subsystem 102, such as applications 202-206 (which can be, for example, a media player application, a file transfer application, and a service discovery application, respectively). For example, operating system 200 can be, but is not limited to, the OS X operating system or the iPhone operating system from Apple Inc. of Cupertino, Calif.; the Windows operating system or the Windows Mobile operating system from Microsoft, Inc. of Redmond, Wash.; the Android operating system from Google Inc. of Mountain View, Calif.; or another full, mobile, or embedded operating system. Operating systems and their functions are known in the art and hence are not described in detail.

To manage the transfer of data to and from applications in electronic device 100 using an appropriate interface in networking subsystem 106, operating system 200 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, datalink, and physical layers. At each layer of the protocol stack, the operating system includes control mechanisms and data structures for performing the functions associated with the layer. The functions associated with each of the layers in the protocol stacks are known in the art and hence are not described in detail.

Networking Subsystem

Figure 3:
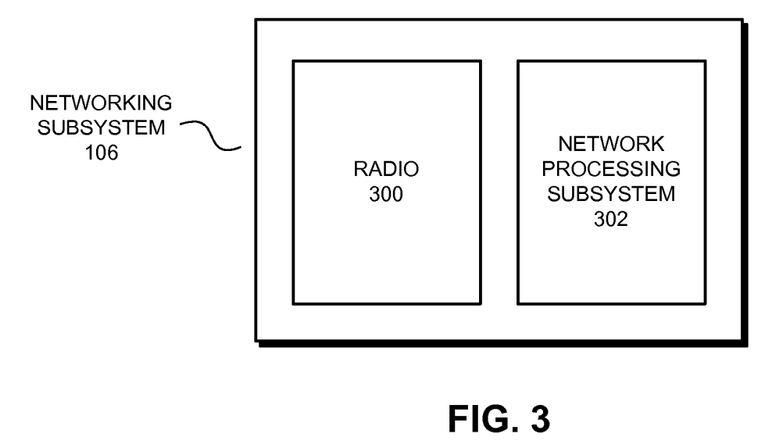
FIG. 3 presents a block diagram illustrating a networking subsystem in accordance with the described embodiments.

FIG. 3 presents a block diagram illustrating an exemplary networking subsystem 106 in accordance with the described embodiments. As can be seen in FIG. 3, networking subsystem 106 includes radio 300 and network processing subsystem 302.

Radio 300 includes the controllers, radios/antennas, and/or other hardware devices used for coupling to, communicating on, and handling data and events on a wireless network.

Network processing subsystem 302 includes one or more processors, ASICs, controllers, and/or circuits for controlling the operation of radio 300 (i.e., for controlling the hardware devices in networking subsystem 106) and handling radio signals transmitted and received by radio 300. For example, in embodiments where networking subsystem 106 includes a Bluetooth™ network interface, network processing subsystem 302 includes a link/connection manager mechanism, a service discovery mechanism, a link protocol mechanism, and/or other mechanisms.

In some embodiments, some or all of the mechanisms for controlling the operation of radio 300 in network processing subsystem 302 are implemented in software. In these embodiments, network processing subsystem 302 can include one or more processors and/or circuits for executing program code that implements the mechanisms. For example, in some embodiments networking subsystem 106 includes a Bluetooth™ network interface. In some embodiments, the Bluetooth™ networking interface is divided into portions, one implemented in radio 300, and the other implemented in network processing subsystem 302. For example, radio 300 can include a controller stack that comprises the links for the Bluetooth™ interface, a link management protocol (LMP), and possibly a host/controller interface (HCI). In this embodiment, network processing subsystem 302 can include a host stack that comprises software and/or hardware mechanisms for implementing a logical link control and adaptation protocol (L2CAP), a service discovery protocol (SDP), a radio frequency communication protocol (RFCOMM), and other protocols.

Note that, although we describe radio 300 and network processing subsystem 302 as including the mechanisms for networking subsystem 106, in some embodiments, some or all of these mechanisms can be included elsewhere in electronic device 100. For example, in some embodiments, some or all of these mechanisms are included in operating system 200. Additionally, in some embodiments, one or more of applications executing on electronic device 100 (e.g., applications 202-206) can control some of the operations of networking subsystem 106.

In addition, although we describe only the Bluetooth™ interface for clarity, alternative embodiments include one or more additional interfaces with hardware and/or software mechanisms in network processing subsystem 302 and radio 300.

Using a Signal Property to Find a Device for Forming a Network Connection

Figure 4:
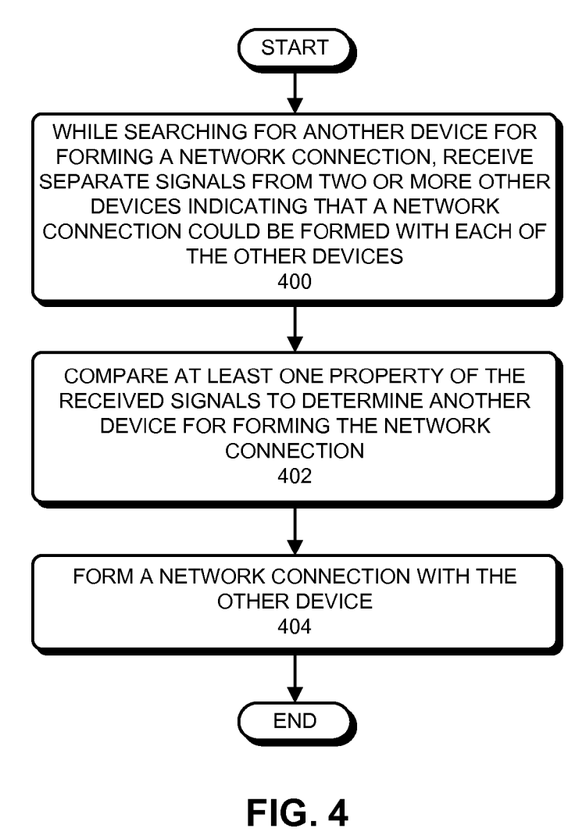
FIG. 4 presents a flowchart illustrating a process for finding another device for forming a network connection in accordance with the described embodiments.

FIG. 4 presents a flowchart illustrating a process for using a property of received signals to find another device for forming a network connection in accordance with the described embodiments. More specifically, in the process shown in FIG. 4, an electronic device 100 (e.g., a smart phone, wireless headphones, etc.) has been configured to find other devices for forming a network connection. Electronic device 100 uses at least one property of received signals to determine another device for forming the network connection.

Note that, although in the following examples we may use a Bluetooth™ network connection for explaining the operations performed by electronic device 100 to find another device for forming a network connection, the described embodiments can use similar operations to find devices for forming other types of network connections. For example, in some embodiments, the network in which the network connection is formed can include, but is not limited to, a cellular, 802.11, or wireless personal-area networking (PAN) network.

In the described embodiments, a user, an application (e.g., applications 202-206), operating system 200, one of the subsystems on electronic device 100, and/or another mechanism can configure electronic device 100 to find other devices. For example, a user could command/configure electronic device 100 to form a network connection upon approaching a particular other device or other devices. As another example, a user or application could configure electronic device 100 generally, so that electronic device 100 forms network connection(s) with available nearby short-range point-to-point radios as they come in range.

The process shown in FIG. 4 starts when, while searching for another device for forming a network connection, networking subsystem 106 in electronic device 100 receives separate signals from two or more devices indicating that a network connection could be formed with each of the other devices (step 400). Generally, the received signals correspond to the type of network connection to be formed. For example, assuming electronic device 100 is attempting to form a Bluetooth™ network connection with the other device(s), networking subsystem 106 could receive responses to inquiry scans.

After receiving the signals, processing subsystem 102 compares at least one property of the received signals to determine another device for forming the network connection (step 402). Generally, the described embodiments can use any property of the signals that can be measured, acquired, derived, and/or computed from a received signal and compared with a similar property from another received signal. For example, in some embodiments, the property of the received signals used by the electronic device is the signal strength of the signals. As another example, some embodiments use a content, arrangement, or format of the received signal (e.g., whether the received signal includes a certain type or arrangement of packets). As yet other examples, as the property of the signal, the electronic device can use, but is not limited to, the amount of information received in a given time (i.e., the number of packets dropped/not dropped); information acquired from the signal or data encoded in the signal (e.g., information about the source, etc.); the uptime/downtime of the signal; the frequency/frequency components of the received signal; the apparent or computed noise in the received signal; the synchronization of transitions in the signal; or the actual/derived electromagnetic properties of the signal.

The information acquired about the property of the received signal depends on the nature of the signal property being compared. For example, if the property is the signal strength, the information can be the strength of the signal in dBm or milliwatts. As another example, if the property is the number of packets received in a given time, the information can be the count of packets in that time. As yet another example, if the property is the frequency or the frequency components of a signal, then the information can be the frequency of the signal or a transform (Fourier transform, etc.) of the signal.

Processing subsystem 102 measures, acquires, derives, or computes information about the property from the received signals and compares the information from each signal to each of the other signals to determine which of the signals is closest to a target (or desired) form or value of the property. For example, if the property is a signal strength of each of the received signals, and the example signal strength is 2.5 mW (e.g., the full broadcast strength of a Bluetooth™ class 2 radio with a 10 m range), electronic device 100 can compare each of the signals to each of the other signals to see which of the signals is closer in signal strength to the example signal strength. As another example, if the property is the packet transfer rate (bandwidth) of a received signal and the example is 3 Mbit/second, electronic device 100 can compare the packet transfer rate for each of the received signals to each other to see which of the signals is closer in bandwidth to the example bandwidth.

More specifically, in some embodiments where the property being compared is the signal strength of the received signals, given a target value of 2.5 mW for signal strength and received signals of 2.3 mW, 2.1 mW, and 1.5 mW, processing subsystem 102 can select one of the signals (e.g., 2.3 mW) and compare the signal strength of the selected signal to the first of the other signals (2.1 mW). Because 2.3 mW is closer to the target value, processing subsystem 102 can discard the 2.1 mW signal (i.e., can determine not to form a network connection with the device that sent the signal). Processing subsystem 102 can then compare the 2.3 mW signal to the 1.5 mW signal, and discard the 1.5 mW signal. Of the original signals, this leaves the 2.3 mW signal as the received signal that is the closest to the target value of 2.5 mW. Thus, electronic device 100 determines that the network connection should be formed with the device from which the 2.3 mW signal originated. In the described embodiments, the device from which the 2.3 mW signal originated can be determined from information encoded or otherwise included in the signal (e.g., in a packet header for the signal).

In some embodiments where the property of the signal is the signal strength of the signal, electronic device 100 can receive or determine a received signal strength indicator (RSSI) for each signal. Generally, the RSSI is a multi-bit value that represents the signal strength for a received signal. In some embodiments, upon receiving a given signal, a measurement mechanism in networking subsystem 106 can measure the strength of the received signal and establish an RSSI for the received signal. In these embodiments, the RSSI for each signal can simply be compared with the other signals' RSSI to determine which of the signals was strongest, weakest, or closest to a predetermined value.

Processing subsystem 102 then selects the received signal that is closest to the target form or value of the property and determines that the network connection should be formed with the device from which the selected signal originated. Electronic device 100 then forms a network connection with the selected device (i.e., with the device for which the property of the signal is the closest to the target value) (step 404).

Note that in these embodiments, if there is a signal at or near a target value, other signals both further above and below the target value may be discarded during the comparison, and the signal with the value nearest the target value or form can be selected. Hence, electronic device 100 can be configured to ignore received signals from broadcasters that are, e.g., too strong, as well as too weak.

Generally, in these embodiments, when forming the network connection, processing subsystem 102 and networking subsystem 106 can perform operations known in the art for forming the particular type of network connection. For example, assuming that a Bluetooth™ network connection is being formed, and that the comparison operation is based on inquiry scan responses received from other devices, networking subsystem 106 can send one or more page inquiries to the determined device and can perform other operations known in the art as part of forming a Bluetooth™ network connection between devices. In addition, after forming the network connection, electronic device 100 can use the network connection in any of the ways known in the art.

Although we describe an embodiment where electronic device 100 forms a network connection with only one other device, in alternative embodiments, electronic device 100 can select more than one device for forming a network connection. In these embodiments, electronic device 100 may select more than one of the signals (i.e., the two or more signals that are closest to the predetermined form or value) and form network connections with the devices from which the signals originated.

Using Additional Received Signal Properties and Contextual Values

Figure 5:
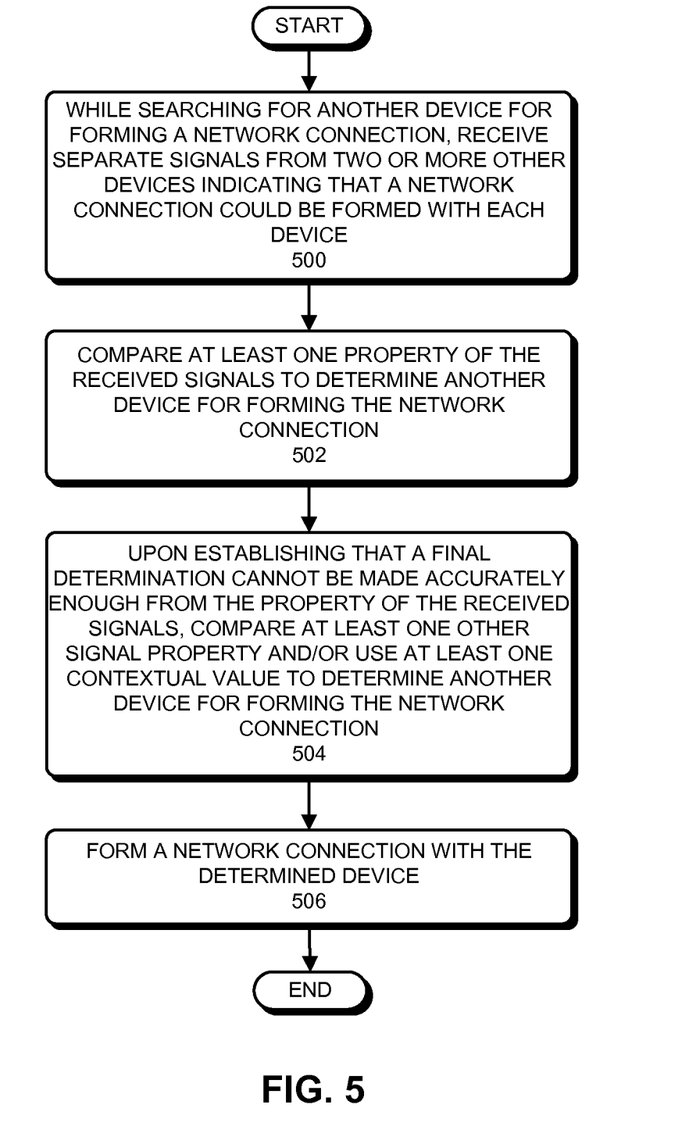
FIG. 5 presents a flowchart illustrating a process for finding another device for forming a network connection in accordance with the described embodiments.

FIG. 5 presents a flowchart illustrating a process for finding another device for forming a network connection in accordance with the described embodiments. More specifically, in the process shown in FIG. 5, electronic device 100 (e.g., a smart phone, wireless headphones, etc.) has been configured to find other devices for forming a network connection.

The process shown in FIG. 5 includes some similar operations to the process shown in FIG. 4. However, the process in FIG. 5 differs in that an additional operation (i.e., step 504) is performed when determining a device for forming the network connection. In this operation, at least one additional signal property can be compared and/or contextual value used to enable electronic device 100 to determine another device for forming a network connection.

The process shown in FIG. 5 starts when, while searching for another device for forming a network connection, networking subsystem 106 receives separate signals from two or more devices indicating that a network connection could be formed with each device (step 500). Generally, the received signals correspond to the type of network connection to be formed. For example, assuming electronic device 100 is attempting to form a Bluetooth™ network connection with the other device(s), networking subsystem 106 could receive several responses to inquiry scans.

After receiving the signals, processing subsystem 102 compares at least one property of the received signals to determine another device for forming the network connection (step 502). For example, processing subsystem 102 can compare the signal strength of each of the received signals to each other to determine the strongest signal. Alternatively, processing subsystem 102 (or networking subsystem 106) can compare the noise in each of the received signals to determine which of the signals is the least noisy.

During the comparison operation, processing subsystem 102 establishes that a final determination of another device for forming a network connection cannot be made accurately enough from the property of the received signals (step 504). Generally, processing subsystem can establish that the final determination cannot be made in cases where the comparison of the property of the received signal is inconclusive, not sufficiently accurate, or impossible. This can happen when the threshold of measurement or comparison is not sufficient to distinguish a difference in the properties for the signals, when one of the signals is corrupted in some way, when the properties are outside of an expected comparison range, or for other reasons.

Upon establishing that the other device cannot be determined from the property of the received signals, processing subsystem 102 compares at least one other signal property and/or uses at least one contextual value to determine another device for forming the network connection (step 504).

In embodiments where the other (second) signal property is compared, any of the signal properties described above with respect to FIG. 4 can be compared for each received signal to find the received signal with a predetermined signal property. Generally, this involves electronic device 100 acquiring information about the second signal property from each of the signals and comparing the acquired information for each of the signals to the other signals to determine which of the received signals has a property that is closest to a predetermined value or form. For example, if the second property is the synchronization of transitions in the signal with reference to a given signal in electronic device 100 (e.g., a clock signal or a data signal), processing subsystem 102 can compare the transitions in each of the received signals to the reference signal and determine which of the signals is more closely synchronized. In some embodiments, the second signal property is a different signal property than the first signal property.

Alternatively, if a contextual property is used in making the determination, processing subsystem 102 can query service subsystem 108 for the contextual property. Generally, the contextual property can be any property that can be used to determine the internal or external environment of electronic device 100. For example, the contextual properties can include, but are not limited to, external properties or values such as: location (e.g., GPS-detected position of device); directional heading (i.e., compass orientation of one or more surfaces or edges of electronic device 100); temperature; time of day; weather; velocity and/or acceleration; ambient light intensity and/or direction; ambient sound intensity and/or direction; magnetic field; and/or other external environmental properties or values. In addition, the contextual properties can include, but are not limited to, internal properties or values such as: applications being executed in electronic device 100; present or prior network bandwidth; operating mode (e.g., low-power mode, full-power mode, etc.); present or prior available computational capacity; the operating system on electronic device 100; and/or other internal contextual properties.

Processing subsystem 102 can then use the contextual value to determine a device for forming a network connection. For example, if a user is facing (or pointing electronic device 100) toward a given device, electronic device 100 can select the device. Alternatively, if an accelerometer and/or an accelerometer log in electronic device 100 indicates that a user is, has been, or was walking toward a device, electronic device 100 can select the device.

After processing subsystem 102 has compared the other signal property and/or used the contextual value and determined another device for forming the network connection (step 504), processing subsystem 102 forms a network connection with the determined device (step 506).

Note, that although we describe embodiments using particular signal properties and contextual values, any signal property and/or contextual value that can be compared can be used in electronic device 100. In addition, although we describe electronic device 100 forming a network connection with one other device, in alternative embodiments, electronic device 100 can form simultaneous network connections with two or more other electronic devices (each of which potentially has a different value or form of the signal properties and/or contextual value). In addition, although we describe comparing a second signal property and/or a contextual value, in some embodiments, processing subsystem 102 can compare any number of signal properties and/or contextual values to make the determination of another device for forming a network connection.

In some embodiments, even if the first comparison is conclusive (i.e., even when there is a clearly distinguishable difference between the signal property), processing subsystem 102 may still make the second determination as a verification step, or for other reasons. More specifically, processing subsystem 102 may compare the second signal property and/or use the contextual value in making the determination of a device for forming a network connection even where the first determination may, by itself, be sufficient for choosing a device for forming the network connection. This can mean that processing subsystem 102 partially or completely ignores the outcome of the first comparison, and makes a determination of the device for forming the network connection based at least in part on the second comparison and/or contextual value determination.

In some embodiments, processing subsystem 102 does not perform step 504, but instead simply chooses one of the signals with which to form a connection (based on the comparison in step 502, which may not be conclusive). In these embodiments, the choice can be random, can be based on a past choice, or can be controlled by the user, operating system 200, an application 202-206, and/or by one of the subsystems in electronic device 100.

Switching Network Connections

In some embodiments, electronic device 100 can continue to receive signals from other devices after a network connection is formed with a given device. In these embodiments, even after the network connection is formed with a device, electronic device 100 can monitor the property (or a different property) for both the signals received from other devices and the signals being received from the device with which the network connection is formed. In these embodiments, electronic device 100 can switch an existing network connection from a first device to a second device upon determining that the signals being received from the second device are closer to a target value for the property than the signals being received from the first device, for example, if a signal strength for a signal received from the second device is stronger, or the signal from the second device is less noisy.

In some embodiments, before switching the network connection, the device can determine whether there is a contextual reason for switching the network connection, for example, if the user has moved, if the user's orientation has changed, if sufficient time (10 seconds, etc.) has passed since the signal from the second device was stronger, if a prior pattern of movement indicates that a change might be intended, or if another context change has occurred. In some of these embodiments, if the contextual value does not indicate that there is a clear reason for changing the network connection, electronic device 100 can maintain the network connection. In some embodiments, the threshold for when the network connection should be switched can be set by operating system 200, the user, or an application, or by using another mechanism.

Embodiments

In the following sections, we describe embodiments of systems that include electronic device 100. Although we describe these embodiments as examples, the embodiments in which electronic device 100 can be used are not limited to these examples; alternative embodiments that perform some or all of the same operations work in a similar way.

Retrieving Information from Another Device

One type of embodiment is an embodiment where a user of electronic device 100 wants to form a network connection with one of two or more nearby devices that each separately broadcast information. Upon forming the network connection, the user can acquire information and/or data (e.g., audio, video, text files, web pages, presentations, etc.) from the device with which the network connection was formed. This can be, for example, in a museum, at a zoo, in a store or shopping mall, at a car lot, at an auction, and other such locations.

Figure 6:
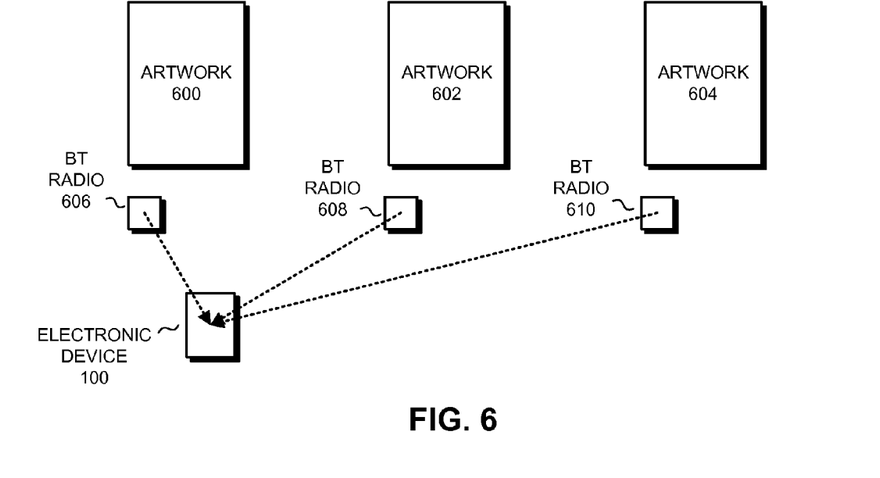
FIG. 6 presents a block diagram illustrating an electronic device near a number of artworks in accordance with the described embodiments.

For example, FIG. 6 presents a block diagram illustrating electronic device 100 near a number of Bluetooth™ radios ("BT radios") 606-610 that are each associated with a given artwork 600-604 in a particular room in a museum or art gallery in accordance with the described embodiments. In this exemplary embodiment, electronic device 100 can be any device that can form a Bluetooth™ connection with BT radios 606-610, e.g., a laptop/netbook, a smart phone, a Bluetooth™ headset, or a media player/receiver (e.g., a device rented out by the museum or gallery to visitors, etc.).

We assume that the user or an application has already configured electronic device 100 to search for available Bluetooth™ devices for forming a network connection to get information about a nearby artwork. In some embodiments, to preserve battery power, electronic device 100 may not continuously search for Bluetooth™ devices for forming a network connection, but instead electronic device 100 can recognize that a user has entered an area in the museum or art gallery where artworks 600-604 are located, and begin searching for other devices for forming a network connection. In these embodiments, the recognition can be made by an application based on a GPS location within the building, a received radio-frequency ID (RFID)/sensor signal, or another electronic indicator.

In some of these embodiments, BT radios 606-610 may be class 3 devices that broadcast at 1 mW (0 dBm), with a 1 m range, may be class 2 devices that broadcast at 2.5 mW (4 dBm), with a 10 m range, or may be modified versions of either class that broadcast in an intermediate range (3 m, 4 m, etc.). For this example, we assume that BT radios 606-610 are configured with an approximately 4 m range. However, in these embodiments, the radio signals are generally configured to enable electronic device 100 to distinguish the difference between the radio signals at expected ranges where electronic device 100 encounters the radio signals from BT radios 606-610 (e.g., at a range where a user stands to view the artwork).

When a user carrying electronic device 100 approaches within 4 m of artworks 600-604, electronic device 100 encounters the radio signals from BT radios 606-610. For example, this can occur as a user enters the room where the artworks are located. As shown by the dashed lines in FIG. 6, each of the signals received by electronic device 100 from the corresponding the BT radios 606-610 propagates a different distance, and hence arrives with a different signal strength. For example, the signal from BT radio 606 may reach electronic device 100 with 95% signal strength (having traveled the shortest distance), whereas the signal from BT radio 610 reaches electronic device 100 with 80% signal strength.

As described above with respect to FIG. 4, in some embodiments, electronic device 100 can receive each of the signals (which in this example are inquiry scan responses from each of BT radios 606-610) and can compare the signal strength of the received signals to determine a BT radio 606-610 with which to form a network connection. After forming the network connection, the user can receive information from the selected BT radio. For example, the user can receive a textual, tactile (Braille), audio, and/or video description of the artwork using the network connection.

In some embodiments, electronic device 100 may further perform the operations described with respect to FIG. 5. In these embodiments, electronic device 100 can use second comparison and/or contextual value determination operations to assist electronic device 100 in determining a BT radio for forming the network connection. Specifically, assume that the user is standing in a location approximately equidistant to two artworks, so the signal strength of each of the corresponding BT radios is similar enough that electronic device 100 cannot distinguish the signals using a comparison of signal strength. In this case, electronic device 100 could determine a direction of a user's velocity or acceleration and/or a compass heading (i.e., where the user is moving with respect to the artworks and/or pointing the top of the electronic device) and use the determined velocity/acceleration and/or compass heading to determine which artwork the user is facing or approaching. This information can be added to the signal strength information and then used to determine a BT radio for forming a network connection.

In addition, in these embodiments, even in cases where the signal strength can be used to clearly identify the artwork, the second signal property and/or contextual value can be used in determining the BT radio (e.g., as a verification or for another reason).

Enabling a Feature of Another Device or Identifying the Electronic Device to Another Device Another type of embodiment is an embodiment where a user of electronic device 100 wants to form a network connection with one of two or more nearby devices for identifying the user and/or enabling a feature of the other device. Upon forming the network connection, electronic device 100 can be used to exchange identification information and commands with the device with which the network connection was formed for performing corresponding operations. This can be, for example, in a parking garage, at a computerized cash register at a grocery store, at home (as a garage door opener or a front door key), etc.

Figure 7:
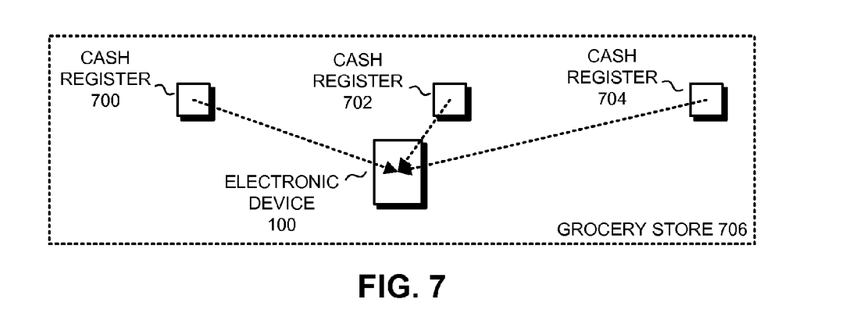
FIG. 7 presents a block diagram illustrating an electronic device near a number of computerized cash registers in accordance with the described embodiments.

For example, FIG. 7 presents a block diagram illustrating electronic device 100 near a number of Bluetooth™-enabled computerized cash registers 700-704 in a grocery store 706 in accordance with the described embodiments. In this exemplary embodiment, electronic device 100 can be any device that can form a Bluetooth™ connection with cash registers 700-704, e.g., a smart phone, a Bluetooth™-enabled identification keyfob (e.g., an electronic keyfob that can identify a particular user), a Bluetooth™-enabled smart card in a wallet, etc.

In these embodiments, a user approaches one of the computerized cash registers (e.g., cash register 702, as shown in FIG. 7) in a grocery store to check out or for another function (e.g., to register a complaint, special order a product, purchase stamps, etc.). Because cash registers in grocery stores are often located within a few feet of other cash registers, the formation of a Bluetooth™ network connection to the closest cash register can be enabled by measuring a signal strength of an inquiry scan response from each of the cash registers, and forming a network connection with the cash register with the strongest signal strength. The Bluetooth™ network connection can then be used to perform the function using the cash register.

As described above with respect to FIG. 5, the determination of which cash register to form a network connection with can be further assisted using one or more other signal properties and/or contextual values, such as the user's location, heading, prior register use, etc. For example, electronic device 100 can use a contextual value such as deceleration or time-at-position to determine when the user has stopped moving so that the network connection is not inadvertently formed with an incorrect cash register.

Figure 8:
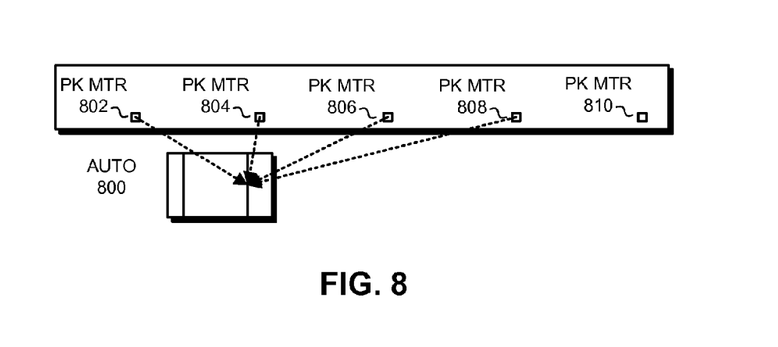
FIG. 8 presents a block diagram illustrating a vehicle that is near a number of parking meters in accordance with the described embodiments.

As another example, FIG. 8 presents a block diagram illustrating a Bluetooth™-enabled auto 800 near a number of Bluetooth™-enabled parking meters (PK MTR) 802-810. In this exemplary embodiment, auto 800 can form a Bluetooth™ connection with a nearby parking meter for identifying itself and paying a fee associated with parking in the corresponding parking space. As with the examples above, there are typically numerous parking meters within effective radio range of one another. Thus, these embodiments can use received signal strength to determine a parking meter with which a network connection is to be formed. In addition, these embodiments can also use one or more contextual values (location, heading, etc.) to assist in making the determination of a parking meter for forming the network connection.

Note, that although in these example embodiments we use the signal strength of received signals as the first property of the signal, and the user's location and heading as the contextual values, in alternative embodiments, other properties or contextual values can be used. Moreover, although we use Bluetooth™ as an example of the network connection that can be formed between electronic device 100 and the other devices, in alternative embodiments, other types of network connection can be formed.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for forming a network connection for an electronic device, comprising, in the electronic device:
   receiving a wireless signal transmitted from each of two or more other devices;
   computing a received signal strength indicator (RSSI) for each of the signals;
   comparing the RSSIs for the signals to determine a signal for which the RSSI is closer to a target RSSI value;

determining a contextual value for the electronic device, the contextual value being representative of a relationship between the electronic device and an external environment in which the electronic device is located;

selecting the other device that was the source of the determined signal, wherein selecting the other device comprises adjusting the selection of the other device to account for the determined contextual value; and based on the comparing and the selecting, forming the network connection with the other device that was the source of the determined signal.

2. The method of claim 1, wherein the method further comprises:

comparing a second property of each received signal to determine a signal that has a second property most like a second target property; and wherein selecting the other device that was the source of the determined signal further comprises adjusting the selection of the other device to account for the source of the signal with the property most like the second target property.

3. The method of claim 1, wherein determining the contextual value includes determining at least one value that represents an internal or external state or environment of the electronic device.

4. The method of claim 1, wherein receiving a signal from each of the other devices includes receiving a signal from each other device that indicates that the other device is available for forming the network connection.

5. The method of claim 1, wherein the method further comprises:

after forming the network connection with the other device that was the source of the determined signal, receiving a wireless signal transmitted from the other device that was the source of the determined signal and one or more other devices;

computing an RSSI for the signal transmitted from the other device that was the source of the determined signal and the one or more other devices and comparing the RSSIs to determine a signal for which the RSSI is closer to a target RSSI value; and if the RSSI of a signal received from a given other device is closer to the target RSSI value than the RSSI of the signal received from the other device that was the source of the determined signal, switching the network connection from the other device that was the source of the determined signal to the given other device by:

disabling the network connection to the other device that was the source of the determined signal; and forming a network connection to the given other device.

6. An apparatus for forming a network connection in an electronic device, comprising:

a processing subsystem; and a networking subsystem coupled to the processing subsystem;

wherein the networking subsystem receives a wireless signal transmitted from each of two or more other devices;

wherein the processing subsystem:

computes an RSSI for each of the signals;

compares the RSSIs for the signals to determine a signal for which the RSSI is closer to a target RSSI value;

determines a contextual value for the electronic device, the contextual value being representative of a relationship between the electronic device and an external environment in which the electronic device is located;

selects the other device that was the source of the determined signal, wherein selecting the other device that was the source of the determined signal comprises adjusting the selection of the other device to account for the determined contextual value; and based on the comparing and selecting, causes the networking subsystem to form the network connection with the other device that was the source of the determined signal.

7. The apparatus of claim 6, wherein the processing subsystem is further configured to compare a second property of each received signal to determine a signal that has a second property most like a second target property; and wherein when selecting the other device that was the source of the determined signal, the processing subsystem adjusts the selection of the other device to account for the source of the signal with the property most like the second target property.

8. An electronic device for forming network connections, comprising:

a networking subsystem configured to:

receive two or more wireless signals transmitted from other devices;

compute an RSSI for each of the signals;

compare the RSSIs for the signals to determine a signal for which the RSSI is closer to a target RSSI value and therefore which signal is from a device that is more favorable for forming a network connection;

determine a contextual value for the electronic device, the contextual value being representative of a relationship between the electronic device and an external environment in which the electronic device is located; and based on the comparing and the determined contextual value, form a network connection with a corresponding one of the other devices.

9. A system, comprising:

two or more devices, wherein each device includes a radio for forming network connections with other devices; and an electronic device, wherein the electronic device includes a processing mechanism configured to:

receive wireless signals transmitted from each of the two or more devices;

determine a contextual value for the electronic device, the contextual value being representative of a property of a relationship between the electronic device and an external environment in which the electronic device is located;

classify at least one of the signals as being from a device from the two or more devices to which a network connection is to be formed by determining that the signal from the device has an RSSI most like a target RSSI and based on the determined contextual value; and based on the classification, form a network connection with the device to which the network connection is to be formed.

10. The system of claim 9, wherein when classifying the signals, the electronic device:

determines at least one contextual value; and uses the contextual value to determine which signal is from a device to which a network connection is to be formed.

11. The method of claim 1, wherein the relationship between the electronic device and the external environment in which the electronic device is located comprises a geographic location of the electronic device.

12. The method of claim 1, wherein the relationship between the electronic device and the external environment in which the electronic device is located comprises a directional heading of the electronic device.

13. The method of claim 1, wherein the relationship between the electronic device and the external environment in which the electronic device is located comprises a compass orientation of the electronic device.

14. The method of claim 1, wherein the relationship between the electronic device and the external environment in which the electronic device is located comprises a weather condition of the environment in which the electronic device is located.

15. The method of claim 1, wherein the relationship between the electronic device and the external environment in which the electronic device is located comprises a time of day.

16. The method of claim 1, wherein the relationship between the electronic device and the external environment in which the electronic device is located comprises at least one of an acceleration or a velocity of the electronic device.

17. The method of claim 1, wherein the relationship between the electronic device and the external environment in which the electronic device is located comprises one of an ambient light intensity or direction detected by the electronic device.

18. The method of claim 1, wherein the relationship between the electronic device and the external environment in which the electronic device is located comprises one of an ambient sound intensity or direction detected by the electronic device.

19. The method of claim 1, wherein the relationship between the electronic device and the external environment in which the electronic device is located comprises one or more electromagnetic fields detected by the electronic device.

* * * * *